Patented Dec. 18, 1945

2,391,146

UNITED STATES PATENT OFFICE 2,391,146

PROCESS FOR PRODUCTION OF ALKYLATED ARYL COMPOUNDS

Hillis O. Folkins, Skokie, and Carlisle M. Thacker, Highland Park, Ill., assignors to The Pure Oil Company, Chicago, Ill., a corporation of Ohio No Drawing. Application August 16, 1943, Serial No. 498,889

9 Claims. (Cl. 260—668)

This invention relates to the preparation of ethylated benzene and particularly to the preparation of monoethyl benzene.

The object of our invention is to prepare ethylated benzene directly from saturated hydrocarbons.

Another object of our invention is to provide a method for reacting cyclohexane with ethylene to produce ethyl benzenes and particularly monoethyl benzene.

Other objects will appear from the following description:

In accordance with our invention, cyclohexane or a hydrocarbon rich in cyclohexane, is contacted with ethylene or a gas rich in ethylene in the presence of a dehydrogenating catalyst under conditions of time, temperature and pressure suitable for causing the cyclohexane to react with the ethylene.

As catalysts for the reaction, may be used any well-known dehydrogenating catalyst. As examples, the following may be mentioned: chromium oxide, molybdenum oxide, vanadium oxide or copper deposited on activated alumina, and nickel. When using an activated alumina catalyst, one of the foregoing oxides or copper may be present in the catalyst in an amount ranging from approximately .5 to 30% by weight of the catalyst. The reaction may be carried out at temperatures ranging from 650 to 1200° F. and at space velocities of 300 to 10,000. Space velocity as used herein means volume of total reactants, as measured in terms of a gas at 0° C. and at a pressure of 760 mm. Hg, passing through a unit volume of catalyst per hour. Pressures from approximately atmospheric up to 500 lbs. per sq. in. may be maintained in the reaction zone, although we prefer to operate within the lower portion of the pressure range. The mole ratio of cyclohexane to ethylene in the reactants is preferably maintained at approximately 1 of cyclohexane to from 0.1 to 1 of ethylene. Mole ratios of ethylene to cyclohexane may be less than the preferred ratios, but ratios of ethylene to cyclohexane in excess of 1 to 1 should be avoided where the process is carried out to produce monoethyl benzene.

Hydrogen is one of the reaction products. A portion of the hydrogen may be recirculated with the charging mixture in order to prolong the life of the catalyst. The amount of hydrogen recirculated may vary from 0 to 500 mole percent of the charging stock.

When operating within the lower portion of the temperature range, space velocities within the lower portion of the range should be used. At higher temperatures, higher space velocities should be used to minimize undesired side reactions.

As charging material for the process, may be used substantially pure cyclohexane or a petroleum fraction rich in cyclohexane, as for example, a $C_6$ cut fractionated from a naphthenic base crude or naphtha. Where the material charged to the process is a mixture of cyclohexane and hexane, the hexane will also to some extent be converted to ethyl benzenes.

Ethylene for the process may be obtained by separating an ethylene-rich fraction from cracked hydrocarbon gases or from hydrocarbon gases from an oil cracking process by means of solvents and/or fractionation under pressure. A fraction containing upward of 40% of ethylene is suitable, although higher concentrations are desirable. If desired, the ethylene for the process may be obtained by catalytic dehydrogenation of ethane at temperatures of approximately 1150 to 1300° F., using such catalysts as chromium oxide or copper on activated alumina.

Under conditions above specified, the reactants react to form ethyl benzenes and hydrogen. If reaction temperature and space velocity are properly regulated, very little of the cyclohexane will crack to form lower boiling hydrocarbons and very little of the ethylene will polymerize to higher boiling hydrocarbons.

The normally liquid reaction product of the process has a high octane rating and is suitable for use as a motor fuel blending agent. The liquid product, if desired, can be purified by fractionation to obtain substantially pure monoethyl benzene which can be dehyrogenated to form styrene in the production of synthetic rubber.

Any unreacted ethylene and cyclohexane in the reaction products as well as cyclohexane which may be produced, may be recovered and recycled to the process with fresh charge.

As an example illustrating the invention, a mixture of cyclohexane and ethylene in a ratio of 1 mole of cyclohexane to 1 mole of ethylene are passed through a catalyst composed of chromium oxide deposited on activated alumina in the ratio of 1 part by weight of chromium to 20 parts by weight of activated alumina, at a temperature of 887° F., under a pressure of 150 lbs. per sq. in. and at a space velocity of 500. Under these conditions, appreciable conversion takes place resulting in a product containing ethylated benzenes.

We claim:

1. The method of preparing ethyl benzene which comprises contacting a petroleum fraction composed essentially of hexane and cyclohexane with a hydrocarbon gas rich in ethylene in such proportion that the cyclohexane and ethylene are present in a mole ratio of about 1 of the former to from 0.1 to 1 of the latter at a temperature of approximately 650° to 1200° F. under a pressure of approximately atmospheric to 500 lbs. per sq. in. and at a space velocity of 300 to 10,000 with a dehydrogenation catalyst and recovering ethyl benzene from the reaction products.

2. The method of preparing ethylated benzene which comprises contacting cyclohexane with ethylene in the presence of a dehydrogenating catalyst at a temperature of approximately 650 to 1200° F. and under a pressure of from approximately atmospheric to 500 pounds per square inch.

3. Method in accordance with claim 2 in which the mole ratio of cyclohexane and ethylene is approximately 1 of the former to from 0.1 to 1 of the latter.

4. Method in accordance with claim 2 in which the catalyst comprises activated alumina and chromium oxide.

5. Method in accordance with claim 2 in which the catalyst comprises activated alumina and molybdenum oxide.

6. Method in accordance with claim 2 in which the catalyst comprises activated alumina and copper.

7. Method in accordance with claim 2 in which the ratio of cyclohexane to ethylene is about 1 mole of cyclohexane to from 0.1 to 1 mole of ethylene and the space velocity is between 300 and 10,000.

8. The method of preparing ethylated benzene which comprises contacting a petroleum fraction rich in cyclohexane with hydrocarbon gas rich in ethylene in the presence of a dehydrogenation catalyst at a temperature of approximately 650 to 1200° F. and under a pressure from approximately atmospheric to 500 pounds per square inch.

9. Method in accordance with claim 8 in which the mole ratio of cyclohexane to ethylene in the mixture is approximately 1 of the former to from 0.1 to 1 of the latter.

HILLIS O. FOLKINS.
CARLISLE M. THACKER.